(12) United States Patent
Graybeal

(10) Patent No.: US 7,316,069 B2
(45) Date of Patent: Jan. 8, 2008

(54) PIPE CUTTING APPARATUS AND METHOD

(76) Inventor: Michael Graybeal, 2709 Scoggin Creek Rd., Bloomington, IL (US) 61704

( * ) Notice: Subject to any disclaimer, the term of this patent is extended or adjusted under 35 U.S.C. 154(b) by 0 days.

(21) Appl. No.: 11/316,434

(22) Filed: Dec. 22, 2005

(65) Prior Publication Data
US 2007/0144012 A1   Jun. 28, 2007

(51) Int. Cl.
B26B 29/00   (2006.01)
(52) U.S. Cl. .............. 30/92; 30/103; 33/483
(58) Field of Classification Search ........ 83/54, 83/178, 184; 30/92, 103; 33/483
See application file for complete search history.

(56) References Cited
U.S. PATENT DOCUMENTS 2,233,715 A * 3/1941 Rea .................. 33/483
2,728,137 A * 12/1955 Elliott .................. 30/107
3,231,285 A * 1/1966 Weltmer et al. ........... 277/418
4,840,360 A * 6/1989 Bartley .................. 269/48.1
6,073,526 A * 6/2000 Pettersson .................. 83/54

OTHER PUBLICATIONS (SHMD). Standard Handbook of Machine Design (2nd Edition) By: Shigley, J.E.; Mischke, C.R. © 1996 McGraw-Hill. pp. 12.12-12.15.*
The Free Dictionary. Printout accessed on Apr. 17, 2007. www.thefreedictionary.com/detent.*

* cited by examiner

Primary Examiner—Boyer D. Ashley
Assistant Examiner—Sean Michalski
(74) Attorney, Agent, or Firm—Husch & Eppenberger LLC; Robert C. Haldiman

(57) ABSTRACT

A pipe cutting supplemental apparatus and method prevents thin-walled pipe from collapsing when being cut with a standard pinch roll cutter. The tool may be embodied as a solid cylindrical insert, or a hollow cylindrical sleeve.

5 Claims, 4 Drawing Sheets

PIPE CUTTING APPARATUS AND METHOD

CROSS-REFERENCE TO RELATED APPLICATIONS

None.

1. Field of the Invention

The present invention is in the field of pipe cutting, particularly in cutting plastic pipe, most particularly polyvinyl chloride pipe.

2. Background of the Invention

Polyvinyl chloride pipe comes in a variety of dimensions and is representative of the class of plastic pipe. Plastic plumbing pipe is less expensive than metal pipe and has come into common usage for that reason. However, plastic pipe in general and certain dimensions of PVC in particular are also weaker than metal pipe.

It remains the convention in the plumbing field for pipe to be cut with pinch roll cutters. These familiar cutters have a circular blade mounted to form one side of a vise type of holder for the pipe. The other side of the vise type gap into which the pipe is placed for cutting includes an extendable holder for the pipe. In operation, the pipe is placed in the pipe cutter in the gap between the holder and the blade and the holder is advanced by the plumber turning a screw fitting until the holder is carried into contact the pipe. The pipe and pipe cutter are then rotated relative to one another so that the circular blade may roll around the entire circumference of the pipe, cutting it to a first depth. Thereafter, the plumber tightens the screw fitting to press blade further into the pipe and rotates the pipe cutter and pipe relative to one another again. This process repeats until the pipe is cut. These pinch roll cutters produce straight smooth cuts of metal pipes that are desirable for the tight liquid seals they create and the ease with which they may be worked. The pinch roll cutter is ideal for a pipe that is sufficiently rigid to withstand the pressure of the advancing screw equipment.

An alternative cutting method for the pipe in general, but more particularly softer plastic pipe, is to simply saw the pipe with a saw blade such as a hack saw. The advantage of this approach is that softer and less rigid materials may be cut without deforming them. The disadvantage is that uneven, rough cuts are generally more difficult to work with and undesirable shavings are also generated.

Unfortunately, some of the dimensions of plastic plumbing in common usage today, including PVC pipe, are thin-walled enough that the use of the preferred pinch roll cutter is impossible. One and one-half inch, one and one-quarter inch and narrower dimensions of plastic pipe in general, and PVC in particular, are too thin-walled to maintain their cylindrical shape in a pinch roll cutter that is screwed tightly enough to cut the pipe. Instead, these pipes crimp, crack or collapse before a cut can be completed. Since the alternative of sawing them is also undesirable for the reasons stated, there is a need in the art for a tool and method of cutting the smaller dimensions of plastic pipe in order to finish with a clean cut. There is a need in the art for a tool to supplement the plastic pinch roll cutter for cutting small dimensions of plastic pipe. Also, if the walls of metal pipe are thin enough, there is a need for a tool to prevent crimping and collapse for them as well. As always, there is a continuing need in the art for economy, durability, ease of manufacturing and ease of use of such tools.

SUMMARY OF THE INVENTION

The present invention is a rigid support to be used in conjunction with a pinch roll pipe cutter. In a first embodiment, the tool is a solid cylinder dimensioned to be inserted within standard diameters of plastic pipe and with a sufficient tolerance to support the plastic pipe walls and to maintain their cylindrical shape from the inside as the pipe is cut from the outside with the pinch roll cutter.

In another embodiment, the tool is itself a cylinder having an inside dimension corresponding within a given tolerance to the outside dimension of the standard dimensions of thin-walled plastic pipe in common usage. The cylindrical outer tool has a window through which the circular blade of the pinch roller may be advanced against the outer wall of the pipe to be cut. The inner wall of the cylindrical tool provides the necessary support to prevent collapse of the pipe being cut.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
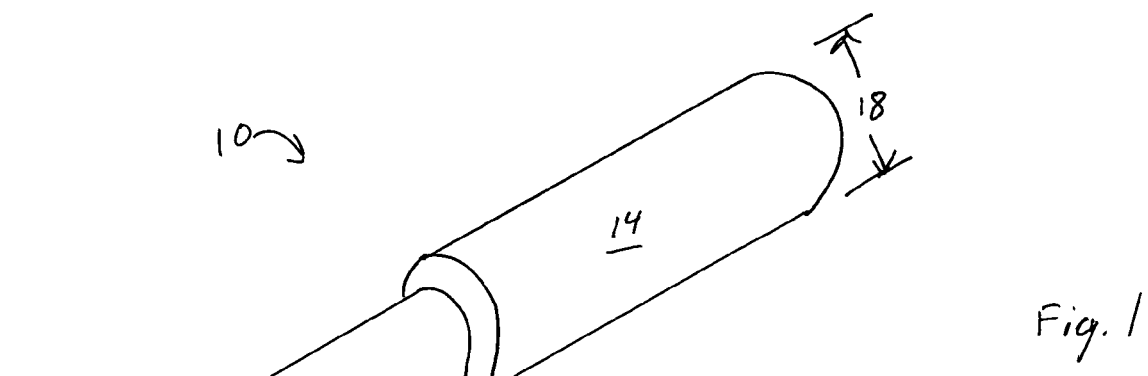
FIG. 1 is a perspective view of the first embodiment of the present invention.

Referring now to the drawings in which like reference numerals refer to like elements, FIG. 1 depicts a solid cylindrical pipe cutting insert according to the present invention. The insert 10 includes a first end 12 and a second end 14, each having different outside diameters. The tool may be of varying length. The first diameter 16 and second diameter 18 would each be a diameter corresponding to a standard inside diameter of plastic piping, in common usage, particularly including polyvinyl chloride (PVC) pipe. The insert 10 may be made of any rigid material, including without limitation plastic or metal.

For example, one and one-half inch PVC pipe in actuality has an outside diameter of approximately 1.480 inches. Such pipe in common usage typically has a wall thickness of 0.070 inches. Accordingly, subtracting both walls, the inner diameter is 1.340 inches. Hence, the dimension 18 of portion 14 illustrated in FIG. 1 would be substantially about 1.340 inches in diameter. Diameter 18 could actually be smaller to a certain tolerance and remain within the scope of the present invention.

Similarly, one and one-quarter inch PVC pipe has an outside diameter of 1.250 inches. Allowing for a wall thickness that is also 0.070 inches, the inner diameter is 1.110 inches. Accordingly, diameter 16 of portion 12 of the insert is substantially about 1.110 inches and may be smaller within a given tolerance. Other types of plastic and even metal pipe may include walls thin enough to collapse under the pressure of a standard pinch roll cutter. For example, one and one-half inch 20-gauge pipe having an outside diameter of 1.5 inches and a wall thickness of 0.020 inches would have an inside diameter of 1.460 inches. Accordingly, an insert 10 made according to the present invention would have an outside diameter of substantially 1.460 inches and could be smaller within a certain tolerance. Similarly, one and one-quarter inch 20-gauge pipe having an outside diameter of 1.25 inches and a wall thickness of 0.020 inches would have an inside diameter of 1.210 inches. Accordingly, a dimension 16 of insert 10 may have an outside diameter of 1.210 inches or slightly smaller than a certain tolerance.

In operation, a plumber inserts the appropriate end, either 12 or 14 inside the pipe to be cut. Thereafter, the pinch roll cutter is applied to the outside of the pipe at a position on the pipe corresponding to the location of the insert on the inside. Pinch roll cutting proceeds as usual, with the plumber tightening the screw head to advance the pipe holder against the pipe and thus apply pressure against the pipe forcing it into the circular cutter blade. With the insert 10 of the present invention installed within the pipe, the thin pipe walls, as they begin to tend towards collapse, come into contact with the outside dimension of the insert and are supported by it. Accordingly, cutting of the pipe wall advances without the pipe loosing its desired cylindrical shape because that shape is maintained by the cylindrical outside diameter of the insert.

The tolerances referred to may vary. The tolerances need only be sufficient to maintain substantially cylindrical shape of the pipe being cut and to prevent cracking, crimping or collapsing of it. The particular material and wall thickness of the pipe may affect the allowable tolerance. For example, a tolerance of about 0.005 would correspond to one and one-half inch PVC.

Figure 2:
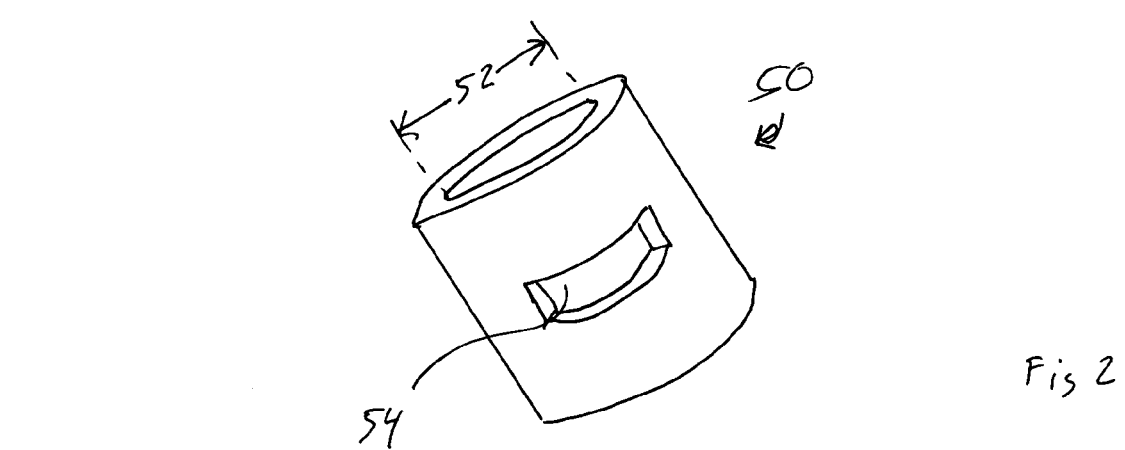
FIG. 2 is a perspective view of the second embodiment of the present invention.

A second embodiment of the present invention is depicted in FIG. 2. A cylindrical sleeve 50 is shown having an inside diameter 52 and a window 54. The inside diameter 52 of sleeve 50 is dimensioned to correspond to the outside diameter of standard sizes of thin-walled pipe in modem usage, including plastic, particularly PVC but also including thin-walled metal pipe. The window 54 is dimensioned to operatively receive the circular blade of the pinch roll cutter. The rest of the circumference of sleeve 50 is solid. Opposite window 54 the solid outside of sleeve 50 may receive the holding and cutting pressure of the screw mount holder of the standard pinch roll cutter.

In operation, the pipe to be cut is inserted into sleeve 50 and advanced until the place that is to be cut appears in window 54. Thereafter the pinch roll cutter circular blade is inserted from the outside through window 54 and the sleeve 50 is placed in the opening of the pinch roll cutter. The pipe holder is applied against the opposite solid side of sleeve 50 and the pinch roll cutter is used in the standard fashion. The pipe being cut is rotated within the internal diameter 52 of sleeve 50. Pressure is applied to the pipe between the circular blade of the pinch roll cutter through window 54 and the opposite inside wall of sleeve 50. The pipe is prevented from crimping or collapsing by the circumferential rigid support of inside diameter 52 of sleeve 50 and the close contact of it with the pipe's outside diameter.

It is within the scope of the present invention that the insert of the embodiment depicted in FIG. 1 and the sleeve depicted in FIG. 2 may come in any dimensions. It is anticipated that a series of inserts or sleeves will be made, sold and used together as a tool kit, similar to the variously sized crescent wrenches commonly found in tool kits.

Figure 3:
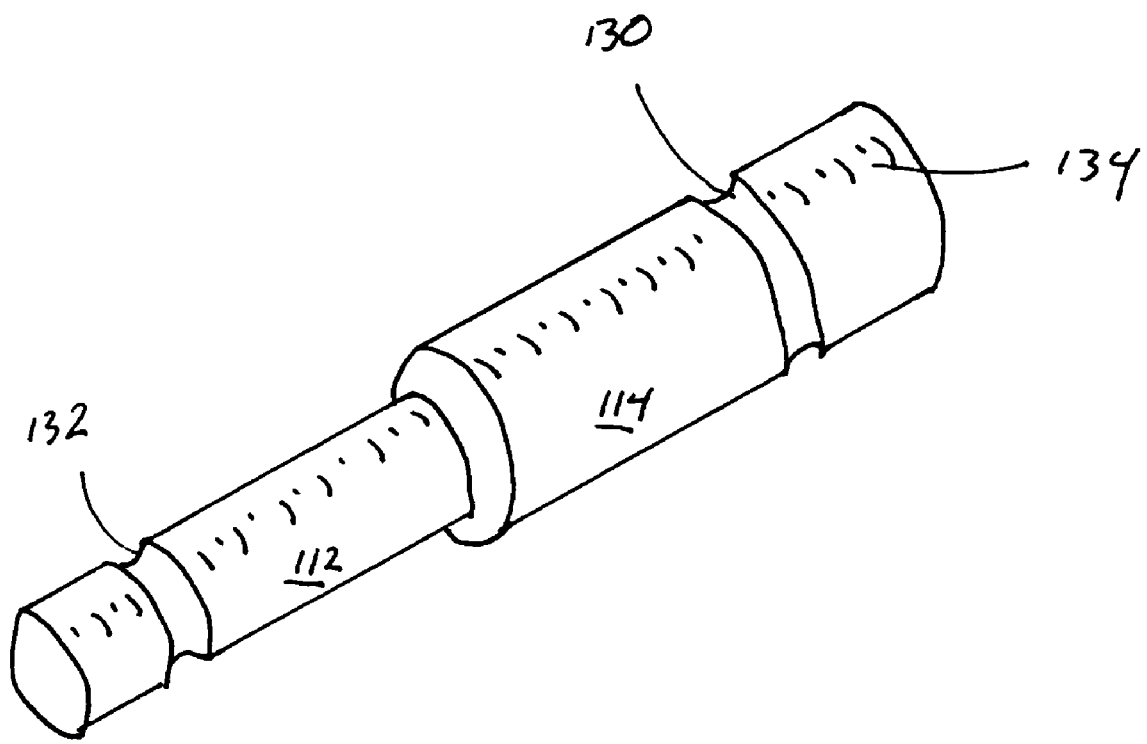
FIG. 3 is a perspective view of an alternative embodiment of the present invention.

FIG. 3 is a perspective view of an alternative version of the present invention. This alternative includes annular detents 130 and 132. These features are located and dimensioned such that a pipe will still be adequately supported during cutting with a pinch roll cutter, while the indentations or recesses 130 and 132 provide a space into which the blade of the pinch roll cutter may be turned without being dulled by contact with the outer dimension of elements 112 or 114. Also depicted in FIG. 3 is a series of hash marks 134 which may be used by the plumber to measure the distance from the end of the tool to the end of the pipe, to assist the plumber in ensuring that his cut is located at a proper distance from the end for support by the tool and/or that his cut is a proper distance from the end of the pipe to align the blade of the pinch roll cutter with one of the annular detents 130 or 132.

Figure 4:
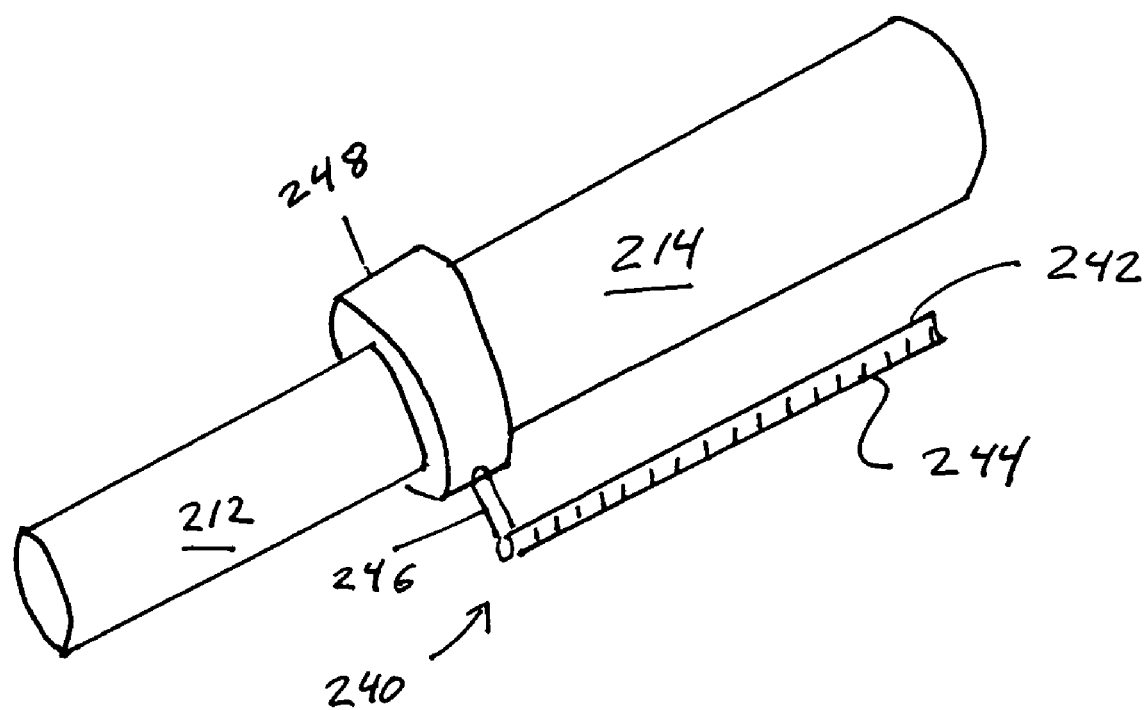
FIG. 4 is a perspective view of an alternative embodiment of the present invention.

FIG. 4 depicts a similar feature, which is assembly 240 designed to extend on the outside of the pipe being cut and also to indicate a distance into the pipe that the tool extends. Accordingly, assembly 240 is comprised of a longitudinal element 242. This element may have upon it hash marks 244 for measuring a distance along the length of the pipe being cut. The longitudinal element 242 may be mounted on a post 246. The post may swivel in order that the longitudinal element may be used in conjunction with either of elements 212 or 214. The post 246 is mounted on an abutment 248, which may also be used as a stop to hold a work piece.

Figure 5:
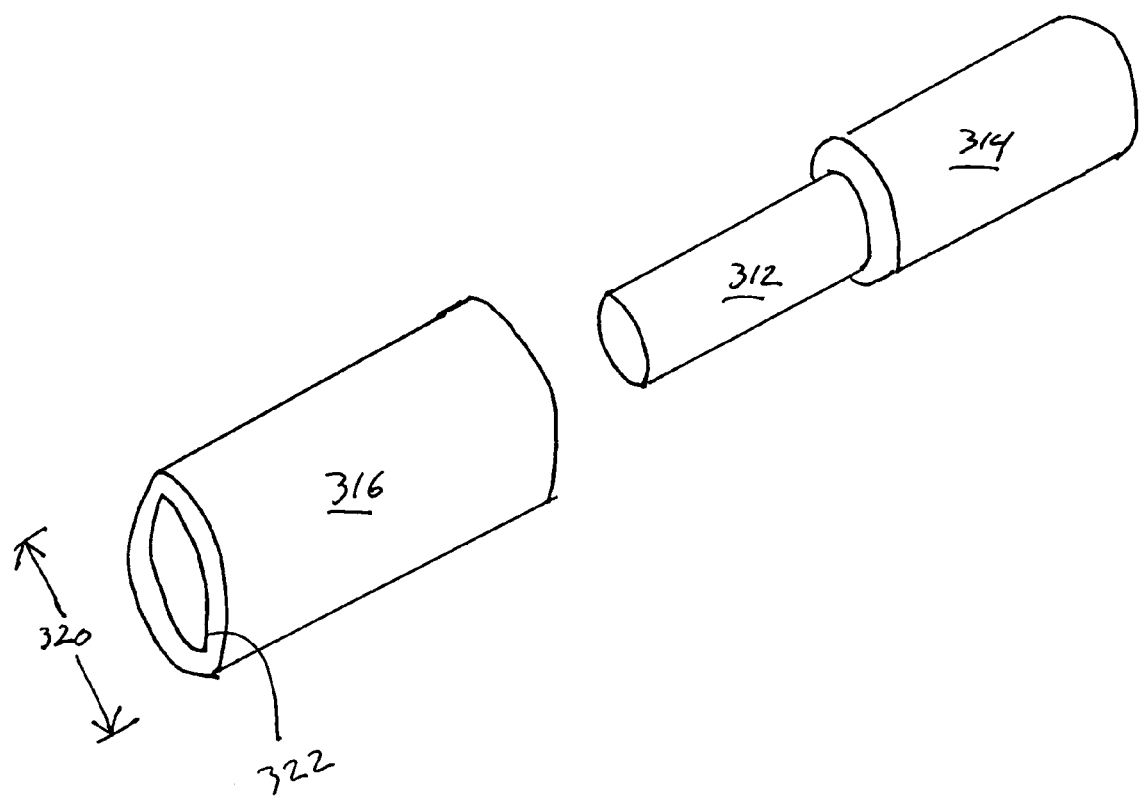
FIG. 5 is a perspective view of an alternative embodiment of the present invention.

FIG. 5 depicts an alternative embodiment of the present invention having an additional extension 316. Additional extension 316 has an outside diameter 320 which is dimensioned to coincide with the inside diameter of another size of pipe in common use. For example, dimension 320, the outside diameter of extension 316, may equal the inside diameter of a 2 inch pipe. The extension 316 also has an interior diameter 322. This diameter is dimensioned to coincide with the outside diameter of element 312 of the tool. Accordingly, extension 316 may be slipped over element 312 and maintained there for storage and/or end use. In operation, use of extension 316 is substantially identical to the operation of element 312 or 314.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A pipe wall support tool for supporting a pipe wall during cutting, comprising:
   a one piece cylinder having a first portion with a first diameter and a second portion with a second diameter;
   said first diameter corresponding to an inside diameter of a first size of pipe;

said second diameter corresponding to an inside diameter of a second size of pipe;

a first annular groove in said first portion and a second annular groove in said second portion;

said first and second annular grooves being dimensioned to receive a cutting blade during cutting such that the pipe wall is cut through entirely without contact between the cutting blade and the pipe wall support tool; and said first and second portions being dimensioned relative to said first and second annular grooves such that said first and second portions maintain supporting contact with the pipe sufficient to resist deformation of the pipe during cutting of the pipe; and a calibration scale comprised of a series of hash marks positioned to indicate the distance from the annular groove to the end of the pipe, said hash marks progressing axially along each of said first and second portions.

2. The tool of claim 1 wherein said tool is solid.

3. The tool of claim 1 wherein said tool is metal.

4. The tool of claim 1 wherein said annular grooves maintain a consistent width throughout their circumference.

5. The tool of claim 1 wherein at least one of said first portion and said second portion terminate at a stop, said stop being located between said first portion and said second portion and said stop being dimensioned to prevent said tool from being inserted in the pipe further than said stop.

* * * * *